(12) United States Patent
Tran et al.

(10) Patent No.: US 7,118,722 B2
(45) Date of Patent: Oct. 10, 2006

(54) HYDROTHERMALLY STABLE METAL PROMOTED ZEOLITE BETA FOR $NO_x$ REDUCTION

(75) Inventors: Pascaline H. Tran, Holmdel, NJ (US); Xinsheng Liu, Edison, NJ (US); James M. Chen, North Brunswick, NJ (US); Gerard D. Lapadula, Piscataway, NJ (US); Howard Furbeck, Hamilton, NJ (US)

(73) Assignee: Engelhard Corporation, Iselin, NJ (US)

( * ) Notice: Subject to any disclaimer, the term of this patent is extended or adjusted under 35 U.S.C. 154(b) by 647 days.

(21) Appl. No.: 10/328,370

(22) Filed: Dec. 26, 2002

(65) Prior Publication Data

US 2003/0108467 A1    Jun. 12, 2003

Related U.S. Application Data

(62) Division of application No. 09/712,210, filed on Nov. 15, 2000, now Pat. No. 6,689,709.

(51) Int. Cl.
*B01J 29/06* (2006.01)

(52) U.S. Cl. .................................. 423/239.2; 423/235
(58) Field of Classification Search ............. 423/239.2, 423/235
See application file for complete search history.

(56) References Cited

U.S. PATENT DOCUMENTS

| | | | |
|---|---|---|---|
| 4,961,917 A | 10/1990 | Byrne et al. ................. | 423/239 |
| 4,985,135 A | 1/1991 | Cody et al. | |
| 5,024,981 A | 6/1991 | Speronello et al. | |
| 5,102,839 A | 4/1992 | Borghard et al. | |
| 5,116,586 A | 5/1992 | Baacke et al. ............... | 423/239 |
| 5,125,231 A | 6/1992 | Patil et al. | |
| 5,143,876 A | 9/1992 | Chang et al. | |
| 5,164,350 A | 11/1992 | Abe et al. | |
| 5,242,677 A | 9/1993 | Cooper et al. ............... | 423/714 |
| 5,271,913 A | 12/1993 | Iida et al. ................. | 423/213.2 |
| 5,522,984 A | 6/1996 | Gajda et al. | |
| 5,589,147 A * | 12/1996 | Farnos et al. ............ | 423/239.2 |
| 5,776,423 A * | 7/1998 | Feeley et al. ............ | 423/239.2 |
| 5,885,440 A | 3/1999 | Hoehn et al. | |
| 6,033,641 A * | 3/2000 | Hall et al. ................. | 423/239.2 |
| 6,143,681 A * | 11/2000 | Sachtler et al. ................. | 502/74 |
| 6,171,556 B1 | 1/2001 | Burke et al. | |
| 6,440,886 B1 | 8/2002 | Gajda et al. | |
| 2003/0050182 A1 * | 3/2003 | Tran et al. ..................... | 502/74 |

FOREIGN PATENT DOCUMENTS

WO         9411623        5/1994

OTHER PUBLICATIONS

Zeolite Beta: The Relationship between Calcination Procedure, Aluminum Configuration, and Lewis Acidity—P.J. Kunkeier, et al., Journal of Catalysts 180, 234-244 (1998), Article No. CA982273.
Stereoselective Mearwein-Ponndorf-Verley and Oppenauer reactions catalysed by zeolite $BEA^1$—E.J. Creyghton, et al., Elsevier Journal of Molecular Catalysis A: Chemical 115 (1997) 457-472.
Progress toward Understanding Zeolite β Acidity: An IR and [27] AI NMR Spectroscopic Study—I. Kiricsl, J. Phys. Chem. 1994, 98, 4627-4634.
States of aluminum in zeolite β and Influence of acidic or basic medium—Yang, et al., Elsevier Zeolites 19:404-410, 1997.
He, et al., "Fe-containing mesoporous molecular sieves materials: very active Friedel-Crafts alkylation catalysts" Applied Catalysis A: General, Elsevier Science, Amsterdam, NL, vol. 169, No. 1, Apr. 17, 1998, pp. 29-36.
Zhang, et al., Alkylation of phenol with *tert*-butyl alcohol catalysed by zeolite Hbeta: Applied Catalysis A: General, Elsevier Science, Amsterdam, NL, vol. 166, No. 1, Jan. 2, 1998, pp. 89-95.
Buchanan, J.S., "Gasoline selective ZSM-5 FCC additives: Model reactions of $C_6$-$C_{10}$ olefins over steamed 55:1 and 450:1 ZSM-5" Applied Catalysis A: General, Elsevier Science, Amsterdam, NL, vol. 171, No. 1, Jun. 29, 1998, pp. 57-64.
Chen, et al., "Reduction of $NO_x$ over various Fe/zeolite catalysts" Applied Catalysis A: General, Elsevier Science, Amsterdam, NL, vol. 194-195, Mar. 13, 2000, pp. 159-168.
Gilot, et al., "A review of $NO_x$ reduction on zeolitic catalysts under diesel exhaust conditions" Fuel, IPC Science and Technology Press, Guildford, GB, vol. 76, No. 6, May 1997, pp. 507-515.
"Progress Toward Understanding Zeolite β Acidity: AN IR and [27] BLNMR Spectroscopic Study" By Kiricsi, J. Phys. Chem., 1994, 98, 4627-4634.
"Mechanisms of Formation of Extraframework $Al_2O_3$ in Zeolites" By Alvarez, et al., Elsevier Science, Inc. , 1997.

* cited by examiner

*Primary Examiner*—Christina Johnson
(74) *Attorney, Agent, or Firm*—Richard A. Negin

(57) ABSTRACT

The present invention is directed to a metal-promoted zeolite beta catalyst useful in the selective catalytic reduction of nitrogen oxides with ammonia in which the zeolite beta is pre-treated so as to provide the zeolite with improved hydrothermal stability.

The stabilized beta zeolite is provided by incorporating into the zeolite structure non-framework aluminum oxide chains. The aluminum oxide chains can be incorporated into the zeolite structure by a unique steaming regimen or by treatment with rare earth metals, such as cerium. The treatment process is unlike well-known methods of dealuminizing zeolites for the purpose of increasing the silica to alumina ratio. In the present invention, the non-framework aluminum oxide is characterized by FT-IR by a peak at $3781 \pm 2$ $cm^{-1}$, which when present, stabilizes the zeolite against further dealumination such as under oxidizing and harsh hydrothermal conditions.

37 Claims, 3 Drawing Sheets

HYDROTHERMALLY STABLE METAL PROMOTED ZEOLITE BETA FOR NO$_x$ REDUCTION

This application is a divisional of 09/712,210, filed Nov. 15, 2000, now U.S. Pat. No. 6,689,709.

BACKGROUND OF THE INVENTION

1. Field of the Invention

The present invention is concerned with a method of catalyzing the reduction of nitrogen oxides with ammonia, especially the selective reduction of nitrogen oxides, with ammonia in the presence of oxygen, using zeolite catalysts, especially-metal-promoted zeolite catalysts. The invention is also directed to hydrothermally stable zeolite catalysts and methods of making same.

2. The Related Art

Both synthetic and natural zeolites and their use in promoting certain reactions, including the selective reduction of nitrogen oxides with ammonia in the presence of oxygen, are well known in the art. Zeolites are aluminosilicate crystalline materials having rather uniform pore sizes which, depending upon the type of zeolite and the type and amount of cations included in the zeolite lattice, range from about 3 to 10 Angstroms in diameter.

Japanese Patent Publication (Kokai) No. 51-69476, published Jun. 16, 1976 on Application No. 49-142463, filed Dec. 13, 1974, discloses a method for reducing nitrogen oxides in waste gases by reaction with ammonia in the presence of a metal-promoted, dealuminized synthetic or natural mordenite zeolite. The resistance of the catalyst to sulfurous poisons, particularly sulfur trioxide and sulfuric acid mist, is said to be enhanced by dealuminizing the mordenite to increase the silica to alumina ratio to more than 12, preferably to more than 15. The zeolite is promoted with 0.5 to 30 wt. % of at least one of a number of promoters including copper, vanadium, chromium, iron, cobalt or nickel and used at a reaction temperature of 200° C. to 500° C. with from 0.5 to three times the stiochiometric amount of ammonia reductant. Example 1 of the Publication illustrates an iron-promoted mordenite ore as being effective for the reduction of nitrogen oxides. In connection with Example 2, it is stated that a slight decrease of the activity of a high silica to alumina ratio, copper-promoted mordenite catalyst is recognized when sulfur trioxide is included in the gas stream. However, an "extreme improvement" of resistance to sulfur trioxide poisoning is noted in comparison with a copper mordenite which has not been dealuminized to increase the silica to alumina ratio.

UK Patent Application No. 2,193,655A discloses a catalyst containing a low surface area titania and a copper-promoted zeolite for use in the reduction of nitrogen oxides with ammonia. The zeolite has an average pore diameter of 10 Angstroms or less, preferably 8 Angstroms or less, and a silica to alumina molar ratio of 10 or more, preferably 20 or more; the resultant titania/-promoted zeolite catalysts having these characteristics are stated to have good mechanical strength and to be resistant to volatile catalyst poisons such as arsenic, selenium, tellurium, etc., contained in exhaust gases. Examples of suitable zeolites are mordenite, ZSM-5, and ferrierite.

U.S. Pat. No. 4,297,328 discloses a "three-way conversion" catalytic process for the simultaneous catalytic oxidation of carbon monoxide and hydrocarbons and reduction of nitrogen oxides for purifying the exhaust gas of automobile engines operated within a prescribed range of air to fuel ratio (column 4, lines 63–68). The disclosed catalyst is a copper-promoted zeolite having a silica to alumina ratio greater than 10, preferably greater than 20 (column 6, lines 23–28). Representative high-silica zeolites are described at columns 6–8 of the patent and include (column 6, lines 29–33) silicalite (as described in U.S. Pat. No. 4,061,724), ZSM-8, ZSM-11, ZSM-12, hyper Y, ultrastabilized Y, Beta, mordenite and erionite. Ultrastabilized Y is described (column 7, lines 22–25) as "a form of zeolite Y which has been treated to give it the organophilic characteristic of the adsorbents of the present invention." Example 6 of the patent is stated to show no measurable loss in combustion activity of the copper-promoted zeolite catalyst due to sulfur poisoning (exposure of the catalyst to methylmercaptan in the gaseous stream). The patent thus discloses the utility of the copper-promoted specified zeolites for three-way conversion in an exhaust gas generated by a lean air to fuel ratio combustion mixture.

The art thus shows an awareness of the utility of metal-promoted zeolite catalysts including, among others, iron-promoted and copper-promoted zeolite catalysts, for the selective catalytic reduction of nitrogen oxides with ammonia.

In accordance with U.S. Pat. No. 4,961,917, there is provided an improved method for the reduction of nitrogen oxides with ammonia. The method described in this commonly assigned U.S. patent comprising the following steps. A gaseous stream containing nitrogen oxides and ammonia, and which may also contain oxygen, is contacted at a temperature of from about 250° C. to 600° C. with a sulfur-tolerant catalyst composition. The catalyst composition comprises a zeolite having a silica to alumina ratio of at least about 10, and a pore structure which is interconnected in all three crystallographic dimensions by pores having an average kinetic pore diameter of at least about 7 Angstroms, e.g. from about 7 to 8 Angstroms, and one or both of an iron and a copper promoter present in the zeolite, for example, in the amount of from about 0.1 to 30 percent by weight, preferably from about 1 to 5 percent by weight, of the total weight of promoter plus zeolite. The zeolite comprises one or more of USY, Beta and ZSM-20. A refractory binder may be admixed with the zeolites. An iron-promoted zeolite beta is preferred and has been commercialized for removing NO$_x$ by selective catalytic reduction such as from gas turbine exhaust.

The iron-promoted zeolite beta has been an effective catalyst for the selective reduction of nitrogen oxides such as by the reduction of nitrogen oxides with ammonia. Unfortunately, it has been found that under harsh hydrothermal conditions, such as reduction of NO$_x$ from gas turbine exhaust at temperatures exceeding 500° C., the activity of the iron-promoted zeolite beta begins to decline. This decline in activity is believed to be due to destabilization of the zeolite such as by dealumination and consequent reduction of metal-containing catalytic sites within the zeolite. To maintain the overall activity of NO$_x$ reduction, increased levels of the iron-promoted zeolite catalyst must be provided. As the levels of the zeolite catalyst increase so as to provide adequate NO$_x$ removal, there is an obvious reduction in the cost efficiency of the process for NO$_x$ removal as the costs of the catalyst rise.

Accordingly, there is a need to improve the process for the selective catalytic reduction of NO$_x$ by ammonia so as to maintain catalytic activity, even under harsh hydrothermal conditions.

There is a further general need for improving the hydrothermal stability of aluminosilicate zeolite catalysts, especially metal-promoted zeolites so as to stabilize such materials from dealumination and loss of catalytic sites during use.

SUMMARY OF THE INVENTION

In accordance with the present invention, a metal-promoted zeolite catalyst useful in the selective catalytic reduction of nitrogen oxides with ammonia is pre-treated so as to provide the zeolite with improved hydrothermal stability. The improved stability is believed to manifest in an improved resistance to dealumination and consequent resistance to removal of catalytic sites from within the zeolite.

In another aspect of the invention, aluminosilicate zeolite catalysts, in general, are stabilized such as against hydrothermal conditions by treating the aluminosilicate zeolites in a manner heretofore not known in the prior art.

Still further, the present invention is directed to a stable aluminosilicate zeolite as well as a metal-promoted aluminosilicate zeolite which is stabilized against loss of catalytic sites.

The stabilized aluminosilicate zeolites in accordance with this invention are provided by incorporating into the zeolite structure non-framework aluminum oxide chains, which are believed to be associated with or even linked to the aluminosilicate framework of the zeolite. The presence of the non-framework aluminum oxide chains is manifest by a unique peak found in the FT-IR spectrum. The presence of this peak at $3781 \pm 2$ cm$^{-1}$ is associated with the improved stability of the zeolite. The non-framework aluminum oxide chains can be incorporated into the zeolite structure by several processes known at this time, including via a unique steaming regimen or by treatment with rare earth metals, such as cerium. While not wishing to be bound by any theory, it is believed that the treatment of the aluminosilicate zeolite decouples aluminum oxide temporarily from the zeolitic framework. The decoupled aluminum oxide molecules are then recombined and linked as a chain, which is reattached to or otherwise associated with the zeolite framework. The treatment process is unlike well-known methods of dealuminizing zeolites for the purpose of increasing the silica to alumina ratio. In the present invention, the alumina is not removed from the zeolite but is believed to be rearranged and otherwise attached or associated with the aluminosilicate framework. The non-framework aluminum oxide chains associated with the FT-IR absorption peak at $3781 \pm 2$ cm$^{-1}$ appear to stabilize the zeolite against further dealumination such as under oxidizing and harsh hydrothermal conditions.

The aluminosilicate zeolites which can be stabilized in accordance with this invention are not known to be limited. Those zeolites which have known catalytic activity, in particular, medium to large pore zeolites appear to be most usefully treated. In general, zeolites having an average pore diameter of at least about 5 Δ are believed to be effectively treated in accordance with this invention. Catalytic processes which involve oxidizing and/or hydrothermal conditions can be operated very effectively with the stabilized aluminosilicate zeolites, including metal-promoted aluminosilicate zeolites treated in accordance with this invention. More specifically, it has been found that iron-promoted zeolite beta which has been treated to provide the non-framework aluminum oxide chains associated with the zeolite framework has increased hydrothermal stability than the iron promoted zeolite beta catalyst which has not been so treated. An iron-promoted zeolite beta catalyst treated in accordance with this invention yields improved activity in the selective catalytic reduction of $NO_x$ with ammonia, especially when operated under high temperatures of at least about 500° C. and high water vapor environments of 10% or more.

DETAILED DESCRIPTION OF THE INVENTION

In order to reduce the emissions of nitrogen oxides from flue and exhaust gases, such as the exhaust generated by gas turbine engines, ammonia is added to the gaseous stream containing the nitrogen oxides and the gaseous stream is then contacted with a suitable catalyst at elevated temperatures in order to catalyze the reduction of nitrogen oxides with ammonia. Such gaseous streams often inherently contain substantial amounts of oxygen. For example, a typical exhaust gas of a turbine engine contains from about 2 to 15 volume percent oxygen and from about 20 to 500 volume parts per million nitrogen oxides, the latter normally comprising a mixture of NO and $NO_2$. Usually, there is sufficient oxygen present in the gaseous stream to oxidize residual ammonia, even when an excess over the stoichiometric amount of ammonia required to reduce all the nitrogen oxides present is employed. However, in cases where a very large excess over the stoichiometric amount of ammonia is utilized, or wherein the gaseous stream to be treated is lacking or low in oxygen content, an oxygen-containing gas, usually air, may be introduced between the first catalyst zone and the second catalyst zone, in order to insure that adequate oxygen is present in the second catalyst zone for the oxidation of residual or excess ammonia. The reduction of nitrogen oxides with ammonia to form nitrogen and $H_2O$ can be catalyzed by metal-promoted zeolites to take place preferentially to the oxidation of ammonia by the oxygen, hence the process is often referred to as the "selective" catalytic reduction ("SCR") of nitrogen oxides, and is sometimes referred to herein simply as the "SCR" process.

The catalysts employed in the SCR process ideally should be able to retain good catalytic activity under high temperature conditions of use, for example, 400° C. or higher, under hydrothermal conditions and in the presence of sulfur compounds. High temperature and hydrothermal conditions are often encountered in practice, such as in the treatment of gas turbine engine exhausts. The presence of sulfur or sulfur compounds is often encountered in treating the exhaust gases of coal-fired power plants and of turbines or other engines fueled with sulfur-containing fuels such as fuel oils and the like.

Theoretically, it would be desirable in the SCR process to provide ammonia in excess of the stoichiometric amount required to react completely with the nitrogen oxides present, both to favor driving the reaction to completion and to help overcome adequate mixing of the ammonia in the gaseous stream. However, in practice, significant excess ammonia over the stoichiometric amount is normally not provided because the discharge of unreacted ammonia from the catalyst would itself engender an air pollution problem. Such discharge of unreacted ammonia can occur even in cases where ammonia is present only in a stoichiometric or sub-stoichiometric amount, as a result of incomplete reaction and/or poor mixing of the ammonia in the gaseous stream. Channels of high ammonia concentration are formed in the gaseous stream by poor mixing and are of particular concern when utilizing catalysts comprising monolithic honeycomb-type carriers comprising refractory bodies having a plurality of fine, parallel gas flow paths extending therethrough because, unlike the case with beds of particulate catalysts, there is no opportunity for gas mixing between channels. It is, therefore, also desirable that the catalyst employed to catalyze the selective catalytic reduction of nitrogen oxides, be effective to catalyze the reaction of oxygen and ammonia, in order to oxidize excess or unreacted ammonia to $N_2$ and $H_2O$.

Commonly assigned U.S. Pat. No. 4,961,917 is predicated on the discovery that a certain class of zeolites, especially when promoted with a promoter such as iron or copper, especially iron, exhibits desired characteristics as described above by providing a sulfur tolerant catalyst which shows good activity for both (1) the selective catalytic reduction of nitrogen oxides by reaction with ammonia, even in the presence of oxygen, and (2) the oxidation of ammonia with oxygen when nitrogen oxides are at very low concentrations. The catalysts disclosed in the above referenced patent retain such activity even after prolonged exposure to high temperatures, hydrothermal conditions, and sulfate contamination of the type often encountered in use, e.g., in the treatment of coal-fired power plants or turbine engine exhaust gases.

Generally, in accordance with the practices of the present invention and as disclosed in U.S. Pat. No. 4,961,917, a catalyst is provided which comprises a zeolite having specific properties as described below, and which is promoted by a metal, preferably iron, in order to enhance its catalytic activity. The zeolite may be provided in the form of a fine powder which is admixed with or coated by a suitable refractory binder, such as bentonite or silica, and formed into a slurry which is deposited upon a suitable refractory carrier. Typically, the carrier comprises a member, often referred to as a "honeycomb" carrier, comprising one or more refractory bodies having a plurality of fine, parallel gas flow passages extending therethrough. Such carriers are, of course, well known in the art and may be made of any suitable material such as cordierite or the like. The catalysts of the present invention may also be provided in the form of extrudates, pellets, tablets or particles of any other suitable shape, for use as a packed bed of particulate catalyst, or as shaped pieces such as plates, saddles, tubes, or the like.

Useful catalysts show a marked resistance to poisoning by sulfates (or other sulfur compounds) which are often contained in the gas streams which are treatable by the catalysts of the present invention. Without wishing to be bound by any particular theory, it appears that $SO_2$ poisoning has both short term and long term effects. For example, flowing a gas stream containing 2,000 parts per million by volume ("Vppm") $SO_2$ through catalysts comprising copper-promoted small to medium pore zeolites such as ZSM-5, naturally occurring chabazite and clinoptilolite, resulted in 10 to 40 percent reduction in SCR process activity. Even at $SO_2$ levels as low as 130 Vppm $SO_2$, significant activity reduction for the SCR process was noted for such catalysts. On the other hand, larger pore zeolites such as Y, L and USY exhibited no short-term $SO_2$ susceptibility. With operating temperatures at about 350° C., the short-term $SO_2$ poisoning effect on a copper-promoting mordenite was shown to be reversible. Thus, when the supply of $SO_2$ to the test gas stream passing through the copper-promoted mordenite catalyst was turned off, the activity for catalytic reduction of NO immediately returned to the same level attained by the catalyst prior to introducing the $SO_2$. Apparently, $SO_2$ is absorbed, but not tightly bound in the zeolite pores. In the case of the small to medium pore zeolites, this competition absorption with $NH_3$ and NO probably results in a physical blockage and/or diffusional restriction.

On the other hand, when zeolite catalysts are subjected to higher $SO_2$ concentrations for longer periods of time, such as 5,000 Vppm $SO_2$ for protracted periods, such as overnight, a 15 to 25 percent activity reduction for the SCR process was noted for copper-promoted, synthetic iron-free zeolites. A 60 percent reduction in SCR process activity is typical for $Fe_2O_3$ containing natural chabazite. Similar results were sustained with iron-promoted mordenite catalysts.

Even at lower levels of $SO_2$ concentration, similar to those likely to be encountered in commercial operations, a permanent activity loss for the SCR process is shown by many zeolite catalysts. For example, a copper-promoted mordenite catalyst was subjected overnight to passage through it of a gaseous stream containing 540 Vppm $SO_2$, and showed a permanent activity loss comparable to that described above for the catalysts subjected to the 5,000 Vppm $SO_2$-containing gas.

For zeolites with silica-alumina ratios of less than 8, the activity loss appears to be associated with insufficient stability under the simulated acidic aging conditions. As indicated by the prior art noted above, the utilization of high ratios of silica to alumina is known to enhance acid resistance of the zeolite and to provide enhanced resistance of the zeolite to acid sulfur poisoning. Generally, silica to alumina ratios well in excess of the minimum of 8 may be employed. Conversion efficiencies of 90 to 93% for $NO_x$ reduction with ammonia have been attained with fresh copper-promoted Beta zeolites having silica to alumina ratios of 20, 26, 28, 37 and 62. A conversion efficiency of 77% was attained by a fresh copper-promoted ZSM-5 zeolite having a silica to alumina ratio of 46. However, fresh copper-promoted USY zeolites with silica to alumina ratios of, respectively, 8 and 30 provided 85% and 39% conversions of $NO_x$ suggesting that at least USY, silica to alumina ratios should be significantly less than 30.

However, resistance to short term sulfur poisoning and the ability to sustain a high level of activity for both the SCR process and the oxidation of ammonia by oxygen has been found to be provided by zeolites which also exhibit pore size large enough to permit adequate movement of the reactant molecules NO and $NH_3$ in to, and the product molecules $N_2$ and $H_2O$ out of, the pore system in the presence of sulfur oxide molecules resulting from short term sulfur poisoning and/or sulfate deposits resulting from long term sulfur poisoning. The pore system of suitable size is interconnected in all three crystallographic dimensions. As is well known to those skilled in the zeolite art, the crystalline structure of zeolites exhibits a complex pore structure having more or less regularly recurring connections, intersections and the like. Pores having a particular characteristic, such as a given dimension diameter or cross-sectional configuration, are said to be one dimensional if those pores do not intersect with other like pores. If the pores intersect only within a given plane with other like pores, the pores of that characteristics are said to be interconnected in two (crystallographic) dimensions. If the pores intersect with other like pores lying both in the same plane and in other planes, such like pores are said to be interconnected in three dimensions, i.e., to be "three dimensional". It has been found that zeolites which are highly resistant to sulfate poisoning and provide good activity for both the SCR process and the oxidation of ammonia with oxygen, and which retain good activity even when subject to high temperatures, hydrothermal conditions and sulfate poisons, are zeolites which have pores which exhibit a pore diameter of at least about 7 Angstroms and are interconnected in three dimensions. Without wishing to be bound by any specific theory, it is believed that the interconnection of pores of at least 7 Angstroms diameter in three dimensions provides for good mobility of sulfate molecules throughout the zeolite structure, thereby permitting the sulfate molecules to be released from the catalyst to free a large number of the available adsorbent sites for reactant $NO_x$ and $NH_3$ molecules and reactant $NH_3$ and $O_2$ molecules. Any zeolites meeting the foregoing criteria are suitable for use in the practice of the present invention; specific zeolites which meet these criteria are USY, Beta and ZSM-20. Other zeolites may also satisfy the aforementioned criteria.

The above-described zeolite catalysts have been very effective for the selective catalytic reduction of $NO_x$ with ammonia. In particular, an iron-promoted zeolite beta has been found most useful in the SCR process for removing $NO_x$ from gas turbine exhaust streams. Unfortunately, at the higher temperatures, e.g. 500° C. or more, provided by recent gas turbine technology, it has been found that the hydrothermal stability of such catalyst is reduced as manifest by a reduced catalytic activity over time. Thus, the present invention is directed to improving the stability of catalysts described in U.S. Pat. No. 4,961,917 for use in SCR processing. Importantly, a further discovery has been made which is believed to be relevant to all zeolite catalysts. A novel zeolite structure has been found which is more resistant to dealumination such as under oxidizing or hydrothermal conditions and the like. Thus, while the treatment of zeolite beta to improve stability is a preferred embodiment of the invention inasmuch as such zeolite catalyst has been proven to be effective in the SCR process, the present invention is also directed to the improvement in stability under oxidizing and/or hydrothermal conditions for any zeolite catalyst. The improvement in stability is provided by incorporating non-framework aluminum oxide units into a zeolite catalyst. The non-framework aluminum oxide units should be present in amounts of at least 10 wt. % relative to total aluminum oxide content in the zeolite to provide the desired stability. Accordingly, examples of zeolite catalysts which can be treated in accordance with this invention include but are not so limited to ZSM-5, ZSM-8, ZSM-11, ZSM-12, zeolite X, zeolite Y, beta, mordenite, erionite.

Figure 1:
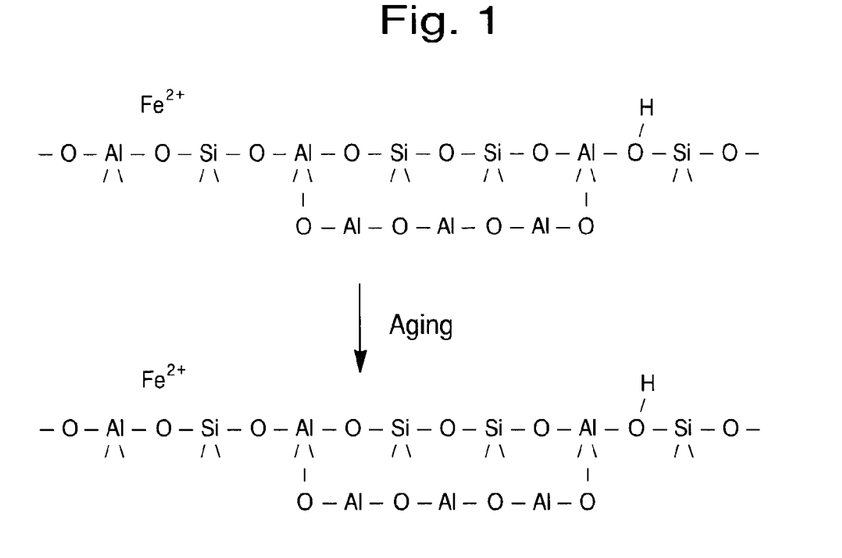
FIG. 1 is a schematic of the aging of the stabilized zeolite of this invention.

The stabilized aluminosilicate zeolites of this invention formed, for example, by the processes as described below, are believed to be characterized as containing non-framework aluminum oxide chains which are attached or otherwise associated with the aluminosilicate framework of the zeolite. FIG. 1 schematically illustrates what is believed to be the structure of the stabilized zeolites containing the aluminosilicate zeolite framework which has attached thereto an aluminum oxide chain 10 comprising alternating aluminum and oxygen atoms. Each end of the aluminum oxide chain 10 is shown as linked to the aluminosilicate framework of the zeolite. It is possible that a portion of the aluminum oxide chains formed may have only one end linked to the zeolite framework and still provide improved stability. This structure, which is illustrated is only theorized and as such, the invention is not to be strictly limited to the structure shown in FIG. 1. It is believed, however, that at least 10% of the aluminum oxide present in the zeolite should be present in the non-framework aluminum oxide units to provide the noticeable improvements in resistance to dealumination during catalyst use. As a consequence of the improved resistance to dealumination, metal promoters such as iron ($Fe^{2+}$) as shown in FIG. 1 remain coordinated to the aluminosilicate tetrahedra of the zeolite framework even upon use under harsh hydrothermal conditions.

Figure 2:
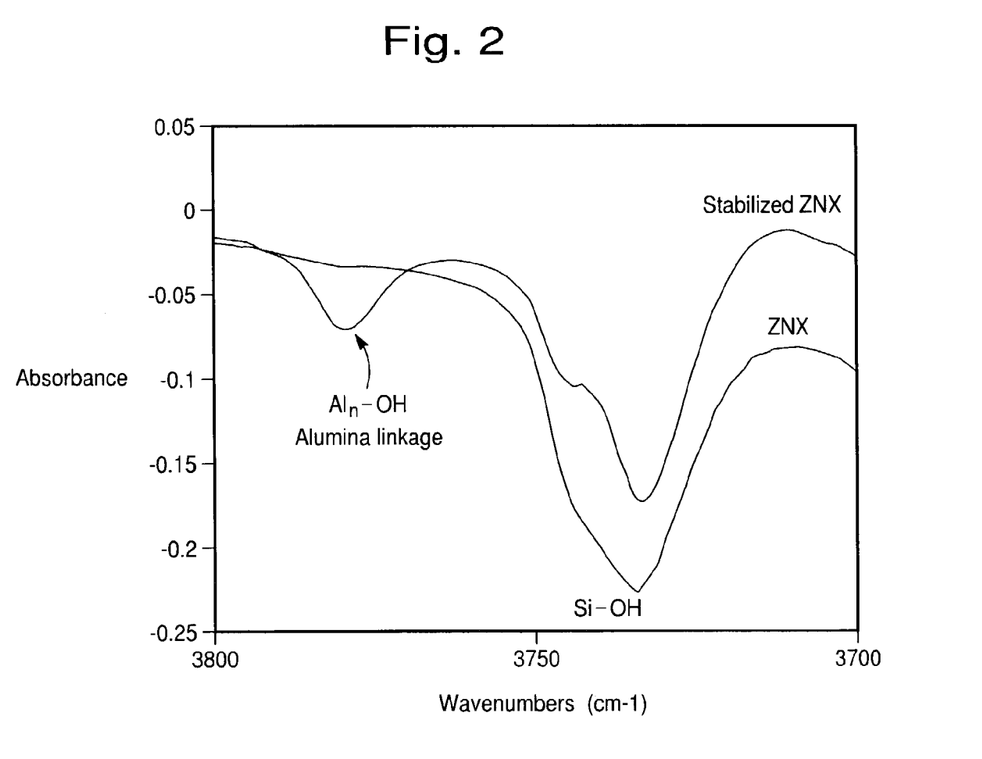
FIG. 2 is a FT-IR Spectra of a stabilized zeolite beta of this invention and a standard zeolite beta.

Regardless of the exact association of the aluminum oxide chain to the zeolite framework, the non-framework aluminum oxide chains have been found to have a characteristic FT-IR adsorption peak at $3781\pm2$ $cm^{-1}$. This characteristic peak 12 is shown in FIG. 2 for zeolite beta, which has either been pre-steamed or which has been exchanged with cerium under acidic conditions. The FT-IR absorption band at 3781 $cm^{-1}$ is a characteristic of non-framework aluminum in the zeolite beta, but is not present in FT-IR of untreated or dealuminized zeolite beta, (ZNX) see FIG. 2. Moreover, a zeolite beta which has been pretreated by exchange with aluminum cations or by the incorporation of aluminum oxide such as by slurry into the pores of the zeolite also do not show the characteristic absorption FT-IR band which is believed to represent extra framework aluminum oxide units linked to or otherwise associated with the aluminosilicate framework found with the stabilized zeolites of this invention. Importantly, to provide the enhanced stability of this invention, the FT-IR peak at 3781 $cm^{-1}$ should have a peak area of at least 0.05 absorbance unit×$cm^{-1}$, preferably at least 0.1 absorbance unit×$cm^{-1}$, and, most preferably, at least 0.2 absorbance unit×$cm^{-1}$.

The improved stability provided to aluminosilicate zeolites has so far been achieved by two distinct processes. In the first process, the zeolite is presteamed under specific conditions prior to the inclusion of the metal promoters. The zeolite to be presteamed can be in the hydrogen, ammonium, or metal cationic form other than the sodium form. It has been found that the sodium form ($Na^+$) of the zeolite will not form the non-framework aluminum oxide by either of the treatments of this invention. The steaming conditions are such as to provide improved resistance to dealumination during use under high temperature, oxidizing conditions, and harsh hydrothermal environments. It is believed that the steaming conditions are such as to provide the non-framework aluminum oxide chains and are not such as to merely dealuminate the zeolite so as to increase the silica to alumina ratio.

In accordance with this invention, zeolite beta can be provided with improved stability for catalyzing the selective catalytic reduction of $NO_x$ with ammonia by pre-steaming the catalyst at temperatures of greater than 600° C. to 800° C. for a period of time of 0.25 to 8 hours. The preferred steam temperature is 650° C. to 750° C. The length of the pre-steaming treatment is preferably from 0.5 to 4 hours and most preferably from 1 to 2 hours. The temperatures for the steaming treatment of this invention are generally lower than those used for removing aluminum from the framework of zeolites, and the length of treatment is generally shorter than that usually provided for dealumination of the zeolite framework. Steaming conditions used to provide stability for other aluminosilicate zeolites other than zeolite beta should be similar to the conditions set forth. Such conditions can be readily determined by steaming the zeolite at conditions such as to provide the peak at 3781±2 cm$^{-1}$ and peak area observed by FT-IR as discussed above.

Subsequent to the steaming treatment, the zeolite can be promoted with various metals. For the use of zeolite beta as in the selective catalytic reduction of NO$_x$ with ammonia, the pre-steamed zeolite beta can be promoted with iron and copper as described in U.S. Pat. No. 4,961,917, the entire contents of which are herein incorporated by reference. In general, the iron or copper promoter, iron being preferred, is added in amounts of from about 0.1 to 30% by wt. calculated as metal based on the total weight of the metal and the zeolite. Preferred levels of the iron promoter ranges from 0.5 to 2.5 wt. %, and most preferred from about 0.7 to 1.5 wt. %.

The second method which has been found to provide zeolite beta with hydrothermal stability during the selective catalytic reduction of NO$_x$ with ammonia is to pre-treat the zeolite beta with a compound of the lanthanide series, such as cerium, prior to exchange with the promoter metal such as iron. Again, it is theorized that the lanthanide being slightly acidic results in the scission of the aluminum oxide from the zeolite framework which aluminum oxide is then recombined as aluminum oxide chains, which are linked to or associated with the zeolite framework. The lanthanides such as cerium are not so acidic as to cause the complete dealumination and removal of the aluminum oxide from the zeolite. In the lanthanide exchange, an aqueous solution of a lanthanide salt at a pH of 2 to 4 is first exchanged into a hydrogen or ammonium zeolite beta to provide a level of lanthanide of approximately 0.25 to 1 wt. % on the zeolite. A metal cationic form other than sodium can also be treated with the lanthanide salt. Subsequent exchange with the metal promoter such as iron is achieved by conventional methods by use of an aqueous metal salt to provide the level of metal promoter as described above. Again, although improved stability has been found with zeolite beta when used to catalyze the selective catalytic reduction of NO$_x$ with ammonia, it is believed that stability for other zeolite catalysts can be achieved inasmuch as the treatment with the lanthanide such as cerium provides the non-framework aluminum oxide chains and consequent increased resistance to dealumination under high temperature, oxidizing or hydrothermal environments.

EXAMPLE 1

Preparation of a standard iron-promoted zeolite beta catalyst was as follows:
1. To 1,000 g of DI water (heated to 80° C.) was added 25.5 g of FeSO$_4$.7H$_2$O.
2. To this solution was added 212.5 g of Na+Beta.
3. The slurry in step 2 was kept with continued stirring at 80° C. for 1 hour and then filtered through a filter press and washed with an additional 2,000 g of water.

EXAMPLE 2

Preparation of honeycomb catalyst.

The filter cake formed in step 3 of Example 1 was slurried in 80 g of water. To this mixture, 44.3% of 20% Zirconium acetate solution was added. A defoamer (5 drops of NAPCO NXZ, defoamer by Hankel Corp.) was also added to the mixture and the whole slurry was sheared with a high shear mixer so as to provide a particle size distribution wherein 90% of the particles were less than 20 microns.

A honeycomb substrate was then dipped coated with this mixture, dried and calcined to 400° C.

EXAMPLE 3

Preparation of a stabilized iron-promoted zeolite beta was as follows:
1. The material prepared in Example 1 was spray dried and then calcined at 650° C. in the presence of 10% steam for 2 hours.
2. This material (212.5 g) was then added to an iron sulfate solution as described in Example 4 below. Concentrated sulfuric acid was then added to maintain a pH 2.
3. The resulting solution was then stirred for 1 hour, filtered and washed with 2,000 g of DI water.
4. A honeycomb catalyst was then prepared via the process as described in Example 2 above.

EXAMPLE 4

The iron sulfate solution used in Example 3 above was prepared as follows:

25.5 g of FeSO$_4$.7H$_2$O were completely dissolved in 1,000 g of DI water. Concentrated sulfuric acid was added slowly to the solution to obtain a pH of 2.

EXAMPLE 5

A NH$_4$+beta was promoted with cerium/iron as follows:
1. 100 g of NH$_4$+beta were dispersed in one liter of 0.05 molar cerium nitrate solution and stirred for 24 hours, filtered and then washed with 2,000 ml. of DI water.
2. This filter cake was added to 1 liter of 0.05 molar FeCl$_2$ solution, stirred 24 hours, dried and then washed with 2,000 ml of DI water.
3. This dry filter cake was then calcined at 600° C. for 6 hours. The final product contained about 0.7% CeO$_2$ and 1.4% Fe$_2$O$_3$.
4. A honeycomb catalyst was then prepared via the process as described in Example 2.

EXAMPLE 6

A sodium zeolite beta was promoted with Aluminum/iron as follows:
1. 200 g of Na+beta was dispersed in 1 liter of 1 molar aluminum nitrate solution, stirred for 5 hours, filtered and then washed with 2,000 ml. of DI water. The mixture was then dried and calcined at 550° C. for 2 hours.

This powder was then added to an iron sulfate solution prepared via Example 4. The pH of the mixture was adjusted to pH 2, stirred for 1 hour, filtered and then washed with 2,000 ml of water.

A honeycomb catalyst was prepared with this material via Example 2.

EXAMPLE 7

The zeolite beta catalysts of Examples 1, 3, 5 and 6 were tested for activity relative to conversion of NO$_x$ as described below.

Activity

The performance of each of the above catalysts was evaluated with a flow thru reactor at 30,000 space velocity with 200 ppm NOx and 200 ppm NH$_3$. The activity was tested at 425° C. and 550° C. Activity was measured as % conversion of NO$_x$ for the fresh catalyst and catalyst aged at 650° C., 30% steam for 387 hours. Table 1 provides data generated at 425° C. and Table 2 provides data generated at 550° C.

TABLE 1

|  |  | Fresh Activity | Aged Activity |
|---|---|---|---|
| Example 3 | Stabilized iron beta | 92 | 58 |
| Example 5 | Cerium/iron beta | 90 | 57 |
| Example 6 | Alumina/iron beta | 92 | 48 |
| Example 2 | Iron beta | 91 | 42 |

TABLE 2

|  |  | Fresh Activity | Aged Activity |
|---|---|---|---|
| Example 3 | Stabilized iron beta | 92 | 61 |
| Example 5 | Cerium/iron beta | 92 | 57 |
| Example 6 | Alumina/iron beta | 92 | 47 |
| Example 2 | Iron beta | 91 | 44 |

It can be seen that the conversion of NO$_x$ using the aged stabilized catalysts of this invention is improved relative to the other catalysts.

Figure 3:
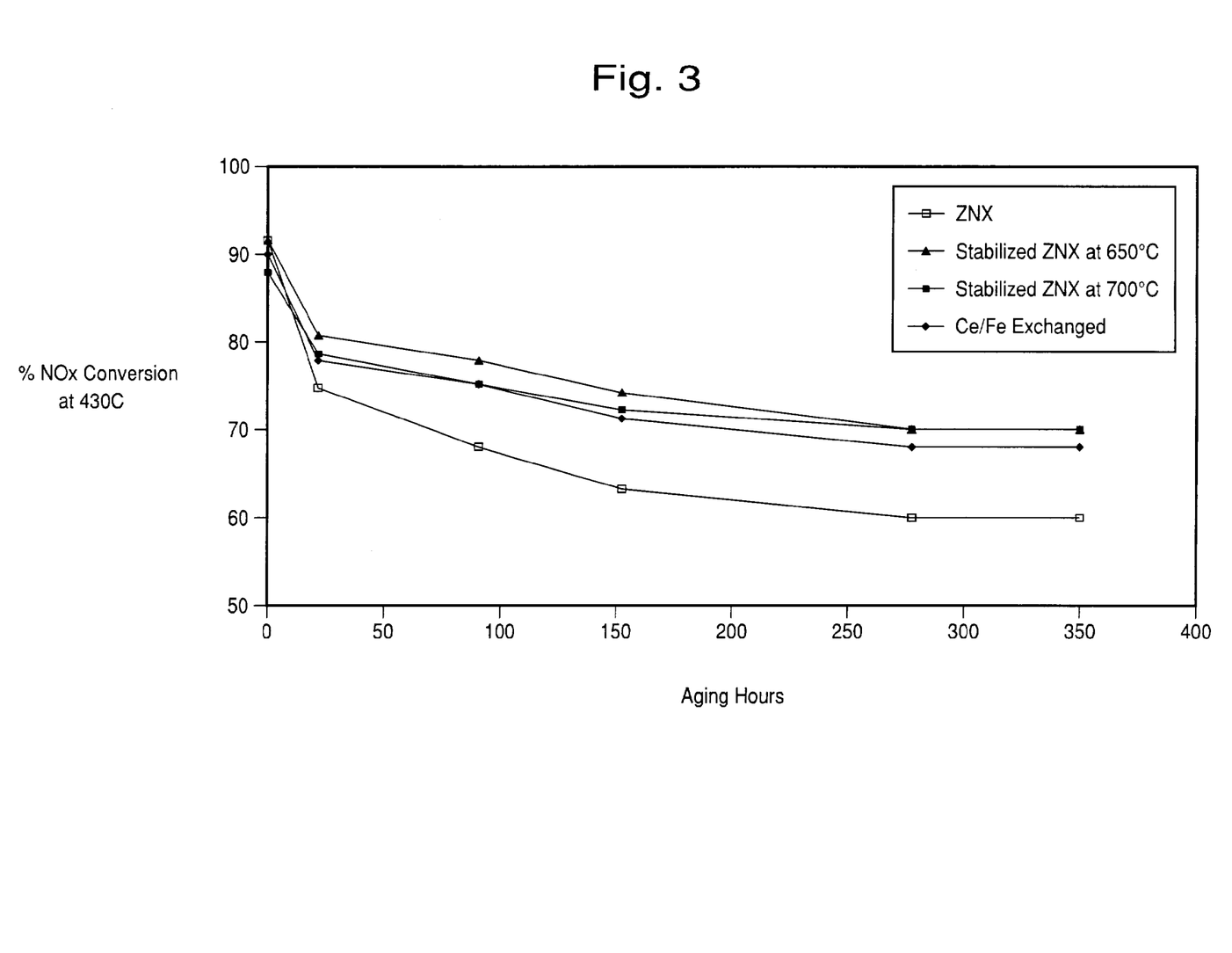
FIG. 3 is a plot of activity for NOx conversion at 430° C. comparing the activity of stabilized zeolite beta catalysts in accordance with the present invention and a non-treated zeolite beta catalyst.
Figure 4:
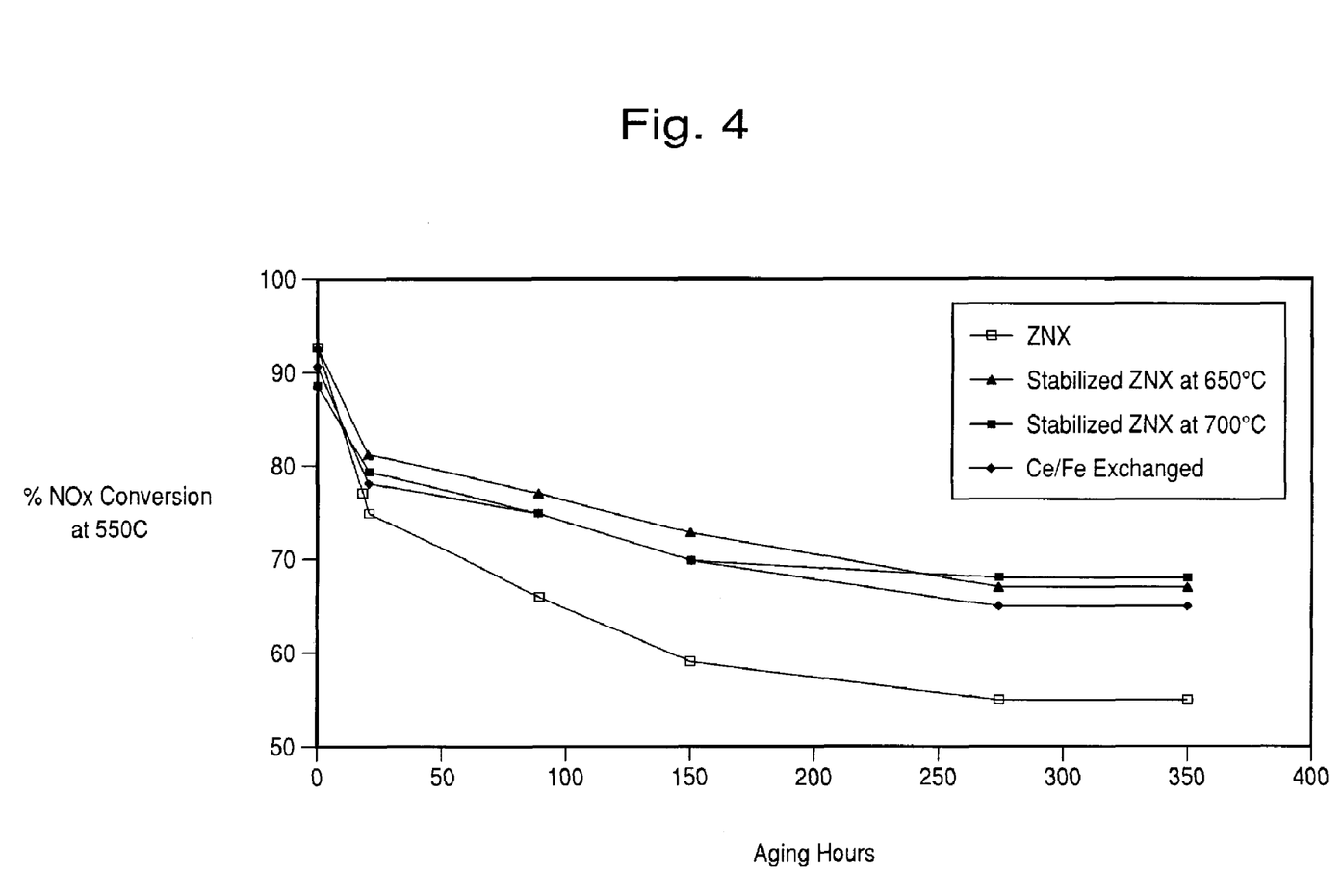
FIG. 4 is a plot of activity for NOx conversion at 550° C. comparing the activity of stabilized zeolite beta catalysts in accordance with the present invention and a non-treated zeolite beta catalyst.

Further data is provided in FIGS. 3 and 4 which show the improvement in catalyst stability (found via improved NO$_x$ conversion) using stabilized iron-promoted zeolite beta catalysts of this invention, steamed at 650° C. and 700° C., respectively, for 2 hours and Cerium exchanged beta compared with untreated beta (ZNX). FIG. 3 shows results of NO$_x$ conversion at 430° C., while FIG. 4 shows results of NO$_x$ conversion at 550° C.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A method for the reduction of nitrogen oxides with ammonia, which comprises:
    contacting a gaseous stream containing nitrogen oxides and ammonia at a temperature of from about 250° C. to 600° C. with a catalyst composition comprising: a metal-promoted aluminosilicate zeolite having improved stability formed by presteaming an aluminosilicate zeolite at a temperature of 600° C.~800° C. for a period of time of 0.25 to 8 hours, said presteaming not providing significant dealumination of said aluminosilicate zeolite, adding metal to said presteamed zeolite, said zeolite having a silica to alumina mole ratio of at least about 8, and a pore structure which is interconnected in all three crystallographic dimensions by pores having an average kinetic pore diameter of at least about 7 Å.

2. The method of claim 1, wherein said metal is added in amounts of from 0.1 to 30% by weight calculated as metal based on the total weight of the metal and aluminosilicate zeolite.

3. The method of claim 2, wherein the metal promoter is present in the amount of from about 0.5 to 2.5 percent by weight of the total weight of the catalytic material.

4. The method of claim 3, wherein the promoter comprises iron.

5. The method of claim 1, wherein the zeolite is selected from the group consisting of USY, beta and ZSM-20.

6. The method of claim 4, wherein the zeolite is beta.

7. The method of claim 1, wherein the catalyst composition further includes a refractory binder admixed with the zeolite.

8. A method for the reduction of nitrogen oxides with ammonia, which comprises:
    contacting a gaseous stream containing nitrogen oxides and ammonia at a temperature of from about 250° C. to 600° C. with a catalyst composition comprising: a stable, metal-promoted aluminosilicate zeolite prepared by ion exchanging an aluminosilicate zeolite with a lanthinide salt and subsequent to said ion exchange with said lanthinide salt, adding a metal promoter by ion-exchange to said lanthinide ion exchanged aluminosilicate zeolite, said zeolite having a silica to alumina mole ratio of at least about 8, and a pore structure which is interconnected in all three crystallographic dimensions by pores having an average kinetic pore diameter of at least about 7 Å.

9. The method of claim 8, wherein said metal is added in amounts of from 0.1 to 30% by weight calculated as metal based on the total weight of the metal and aluminosilicate zeolite.

10. The method of claim 9, wherein the metal promoter is present in the amount of from about 0.5 to 2.5 percent by weight of the total weight of the catalytic material.

11. The method of claim 10, wherein the promoter comprises iron.

12. The method of claim 8, wherein the zeolite is selected from the group consisting of USY, beta and ZSM-20.

13. The method of claim 12, wherein the zeolite is beta.

14. The method of claim 8, wherein the catalyst composition further includes a refractory binder admixed with the zeolite.

15. A method for the reduction of nitrogen oxides with ammonia, which comprises:
    contacting a gaseous stream containing nitrogen oxides and ammonia at a temperature of from about 250° C. to 600° C. with a catalyst composition comprising: (a) a stabilized aluminosilicate zeolite comprising non-framework chains of alternating aluminum and oxygen atoms separate from the framework of the zeolite, at least 10% of the aluminum oxide of said zeolite, being in the form of said non-framework chain, said zeolite having a silica to alumina mole ratio of at least about 8, and a pore structure which is interconnected in all three crystallographic dimensions by pores having an average kinetic pore diameter of at least about 7 Å.; and (b) a metal promoter.

16. The method of claim 15, wherein said metal is added in amounts of from 0.1 to 30% by weight calculated as metal based on the total weight of the metal and aluminosilicate zeolite.

17. The method of claim 16, wherein the metal promoter is present in the amount of from about 0.5 to 2.5 percent by weight of the total weight of the catalytic material.

18. The method of claim 17, wherein the promoter comprises iron.

19. The method of claim 15, wherein the zeolite is selected from the group consisting of USY, beta and ZSM-20.

20. The method of claim 19, wherein the zeolite is beta.

21. The method of claim 15, wherein the catalyst composition further includes a refractory binder admixed with the zeolite.

22. A method for the reduction of nitrogen oxides with ammonia, which comprises:
   contacting a gaseous stream containing nitrogen oxides and ammonia at a temperature of from about 250° C. to 600° C. with a catalyst composition comprising: a stabilized metal-promoted aluminosilicate zeolite having an FT-IR adsorption peak at 3781±2 $cm^{-1}$.

23. The method of claim 22, wherein said metal is added in amounts of from 0.1 to 30% by weight calculated as metal based on the total weight of the metal and aluminosilicate zeolite.

24. The method of claim 23, wherein the metal promoter is present in the amount of from about 0.5 to 2.5 percent by weight of the total weight of the catalytic material.

25. The method of claim 24, wherein the promoter comprises iron.

26. The method of claim 22, wherein the zeolite is selected from the group consisting of USY, beta and ZSM-20.

27. The method of claim 26, wherein the zeolite is beta.

28. The method of claim 22, wherein the catalyst composition further includes a refractory binder admixed with the zeolite.

29. The method of claim 1, wherein said gaseous stream is contacted with said catalyst at a temperature of greater than 500° C.

30. The method of claim 8, wherein said gaseous stream is contacted with said catalyst at a temperature of greater than 500° C.

31. The method of claim 15, wherein said gaseous stream is contacted with said catalyst at a temperature of greater than 500° C.

32. The method of claim 22, wherein said gaseous stream is contacted with said catalyst at a temperature of greater than 500° C.

33. The stabilized aluminosilicate zeolite catalyst of claim 22, wherein said peak has an area of at least 0.1 absorbance unit×$cm^{-1}$.

34. The stabilized aluminosilicate zeolite catalyst of claim 22, wherein said peak has an area of at least 0.2 absorbance unit×$cm^{-1}$.

35. The method of claim 22, wherein said peak as an area of at least 0.05 absorbance unit×$cm^{-1}$.

36. The method of claim 22, wherein said peak as an area of at least 0.1 absorbance unit×$cm^{-1}$.

37. The method of claim 22, wherein said peak as an area of at least 0.2 absorbance unit×$cm^{-1}$.

* * * * *